Patented Feb. 16, 1954

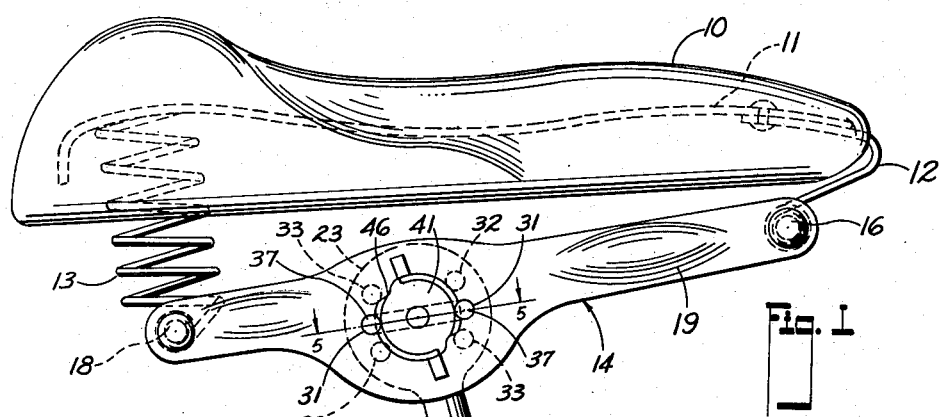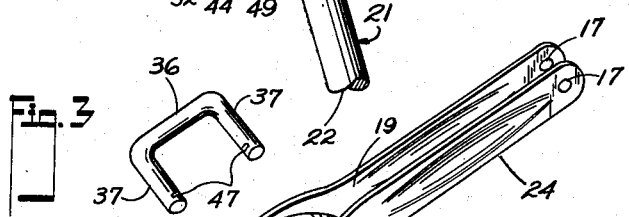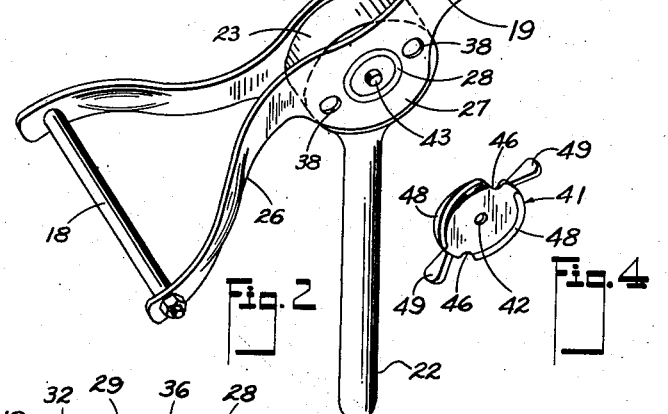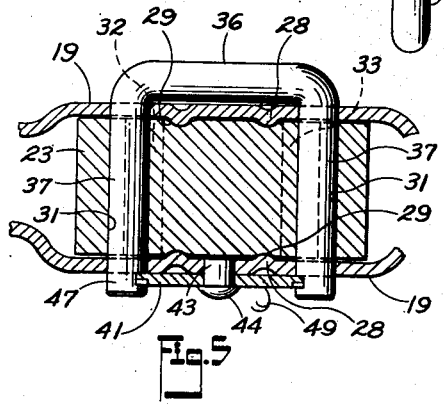

2,669,283

UNITED STATES PATENT OFFICE 2,669,283

BICYCLE SADDLE SUPPORT

Roland W. Faulhaber, Monroeville, Ohio, assignor to The Faulhaber Company, Monroeville, Ohio, a corporation of Ohio Application March 20, 1948, Serial No. 16,058

5 Claims. (Cl. 155—5.22)

This invention relates to saddles for bicycles or the like and more particularly to an improved arrangement for mounting saddles upon children's tricycles or bicycles. It is desirable in mounting a saddle on a cycle to provide for adjustment of the angle of the seat for the greatest comfort of the rider and to suit individual tastes. While many arrangements for this purpose have been proposed, they are, in general, either impositive in action, complicated, or expensive to produce.

The principal objects of this invention are:

To improve the mounting of cycle saddles;

To provide an adjustment of the angle of a saddle which adjustment is easy to change, flexible as to position, and will positively maintain the angular relation of the parts after it is set;

To provide a connection between a saddle post and a saddle which eliminates play or lost motion;

To provide a cycle saddle mounting which may be adjusted without the use of tools; and To provide a cycle saddle mounting which is simple, inexpensive to produce, strong, and reliable.

Other objects and advantages of the invention, and the manner in which the objects are realized, will be apparent to those skilled in the art from the description herein of the preferred embodiment of the invention.

Referring to the drawings:

Fig. 1 is an elevational view of a saddle embodying a post and reach connection in accordance with the invention;

Figs. 2, 3, and 4 are perspective views together constituting a partially exploded view of the invention; and Fig. 5 is a partial sectional view taken on the plane indicated in Fig. 1.

The improved saddle includes a seat 10, the frame 11 of which is supported in any desired manner, as by a nose spring 12 and coil springs 13, on a reach member 14. The construction of the saddle and its frame and supporting springs may be conventional and the mounting of the springs 12 and 13 on the reach member 14 may be in accordance with standard practice. As illustrated, the nose spring 12 is looped around a pin 16 passing through holes 17 in the forward end of the reach member and the springs 13 are mounted on a rod 18 joining the rear ends of the reach member.

As illustrated herein, the reach member 14 is, in effect, constituted by two side pieces 19, the pin 16, and the rod 18. However, the form of the reach member may be varied within the scope of the present invention, which is directed primarily to the coupling between the reach member and a saddle post 21. The saddle post 21 comprises a post portion 22 and a cylindrical head 23 at the upper end thereof, the head having a horizontal axis and vertical end faces. The side pieces 19 of the reach member are preferably stamped and formed from sheet metal and are constituted by approximately straight parallel forward sections 24, diverging rear sections 26, and a wider central section 27 adapted to engage the face of the head 23 of the post. The portions 24 and 26 of the side pieces may be deformed to a curved cross section to increase their rigidity, as shown, and the end parts may converge toward each other slightly immediately in front and to the rear of the head 23.

The central portions 27 of the side pieces are stamped to provide an annular inwardly directed rib 28 on each, and the faces of the head 21 are formed with annular grooves 29 to receive the ribs 28. Engagement of the ribs 28 in the grooves 29 tends to center the reach member on the saddle post and define an axis about which the reach member is rotated to adjust the angle of the seat. The resilience of the side portions 19 tends to retain the ribs 28 in the grooves 29, but the reach member may be lifted from the post by a slight springing of the members 19.

The height of the ribs 28 may be slightly greater than the depth of the groove 29, as illustrated, so that the inner faces of the members 19 are slightly spaced from the outer faces of the head 23 except where the annular rib 28 engages the groove.

The head 23 is cross-drilled to provide a plurality of pairs of holes 31, 32, and 33, the holes of each pair being preferably, although not necessarily, equally spaced from the aforementioned axis of rotation. Preferably the planes which intersect the axes of the holes of each pair make approximately equal angles with the next plane. Holes 38 are punched through the reach member, so spaced that they may be aligned with any one of the pairs of holes 31 to 33. The reach member is supported on the post and locked in any one of the several positions of angular adjustment by a bifurcated key 36. This key may be conveniently formed from a piece of rod by bending the ends at right angles to form legs 37. The several holes 31 to 33 and 38 are dimensioned for an easy sliding fit of the legs 37 of the key, which may be thus inserted through the reach member and the head of the post. Thus the reach member 14 may be slipped over the head 23 of the saddle post with the holes 38 aligned with the holes 31, 32, or 33, and the legs 37 of the key may be passed through the aligned holes. The key 36 thus supports the weight of the saddle and rider and fixes the angular relation of the saddle and its supporting post 21.

Various means for retaining the key 37 in place may be adopted, but the preferred arrangement illustrated in Figs. 1, 4, and 5 is one which not only retains the key, but compresses the members 19 into engagement with the faces of the saddle post head to assist in preventing any lateral shifting or lost motion of the saddle. In its preferred form, this device comprises a rotary cam or wedge 41 of generally circular form with a central hole 42 by means of which it is pivotally mounted on a stud 43, which may be spot welded or otherwise secured onto or in one of the members 19 mid-way between the holes 38. As shown in Fig. 5, the stud 43 may be riveted or peened to form a head 44 to retain the wedge device 41 after the latter is in place. The cam 41 is formed with opposed notches 46 in its periphery which may be aligned with the holes 38 to permit introduction of the key 36. Notches 47 are formed adjacent the outer ends of the legs 37 of the key, and when the key is inserted, these notches register with the cam 41, which has marginal portions 48 formed with increasing thickness circumferentially of the rim from the notches 46, so that upon engaging the portions 48 in the slots 47 and rotating the cam, the key 36 is pulled firmly into position and the members 19 are pressed against the head 23. Wings 49 formed on the cam member 41, similar to the wings of a wing nut, permit it to be turned by hand to lock or to release the key 36. As will be seen, with the key in place and the cam turned until it is tight, the whole assembly is rigidly locked together without any significant possibility of lost motion and the whole may be readily disassembled upon rotation of the cam 41. If it is desired to change the angle of the seat, the key may be inserted in the holes 32 or 33 instead of the holes 31.

Preferably, a plane defined by the axes of the holes 31 makes an angle with a plane normal to the post portion 22 approximately equal to one-fourth the angle of intersection between the plane defined by the axes of the holes 31 and a plane defined by the axes of the holes 32 or 33. Thus, by disengaging the reach member from the saddle post and turning the saddle post 180° about its own axis, the angle of the saddle may be varied by a step equal to one half that obtained by moving the key 36 between the holes in the head.

It will be apparent, of course, that it is not essential to the invention that the reach member embrace the head of the saddle post as it would be within this invention to form the head of the saddle post so that it embraces the reach member. Alternatively, it would be possible to provide a reach member which engages only one side of the head of the saddle post. It will likewise be apparent that instead of providing a plurality of holes in the head of the saddle post, the construction may be reversed to provide a plurality of holes in the reach member and a single pair of holes in the head. Or if desired, more than one pair of holes may be provided in each member and the relative angular spacing of the pairs of holes in the separate members may vary.

The ribs 28 of the reach member are preferably slightly greater in height than the depth of the grooves 29 in the saddle post. Thus, when the cam 41 is rotated to draw the member 36 into engagement with the reach member, the latter can spring slightly, thus providing a slight spring tension on the key 36. This eliminates any tendency to lost motion or rattling in the seat and minimizes the possibility of the cam backing off and loosening the key.

The saddle post 21 may, of course, be supported in the cycle in any convenient manner.

Although one object of the invention is to mount a saddle adjustably, it will be apparent that the invention also provides a highly satisfactory removable mounting arrangement for a saddle if the feature of adjustability is omitted. For a fixed saddle, only two holes in the saddle post and two holes in each reach member side portion are needed.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. The combination of a saddle post member, a saddle having a reach member, the saddle post and reach members being formed with transverse holes so located that a pair of holes in the reach member are alignable with a pair of holes in the post member, a bifurcated key formed for insertion through the aligned pairs of holes in the said members, the key being formed with shoulders adjacent the ends of the furcations, and a wedging device engageable between the said shoulders and one of said members to retain the key in place and compress the said members together.

2. The combination of a saddle post member, a saddle having a reach member, the saddle post and reach members being formed with transverse holes the holes in one of the members constituting a plurality of pairs of holes of different angular relation with respect to the said member so that a pair of holes in the reach member are alignable with a pair of holes in the post member in a plurality of relative angular positions of the said members, a bifurcated key formed for insertion through the aligned pairs of holes in the said members, the key being formed with shoulders adjacent the ends of the furcations, and a wedging device engageable between the said shoulders and one of said members to retain the key in place and compress the said members together.

3. The combination of a saddle post member, a saddle having reach members disposed on each side of the post member, the saddle post and reach members being formed with transverse holes so located that a pair of holes in the reach members are alignable with a pair of holes in the post member in a plurality of relative angular positions of the said members, a bifurcated key formed for insertion through the aligned pairs of holes in the said members, the key being formed with shoulders adjacent the ends of the furcations, and a rotatable cam wedging device on one of said reach members engageable against the said shoulders to retain the key in place and compress the said members together.

4. In combination, a seat including a reach member, a supporting member therefor, the supporting member comprising a post and a head, the head being formed with a plurality of holes substantially normal to the axis of the post arranged in pairs at the opposite ends of diameters intersecting each other and the axis of the post at a common center, said pairs of holes being so located that planes including the axes of different pairs of holes are disposed at angles to the axis of the post varying approximately by an equal increment, and means engaging the reach member and selectively engaging within one of the said pairs of holes to support the reach member adjustably on the supporting member, the said planes being asymmetrically angularly disposed in relation to the plane normal to the axis of the post, and the head being reversible about the axis of the post, so that additional adjusted positions of the reach member may be obtained without changing the relation between the seat and the said common center.

5. The combination of a saddle post member, a saddle having a reach member, the post member being formed with a head engaging the reach member, the head and reach member being formed with pairs of angularly spaced holes to receive a bifurcated key therethrough to support the reach member in different angular positions on the head, a bifurcated key inserted through the reach member and head, the head and reach member being formed with portions with complementary annular non-planar engaging surfaces to align the head and reach member to facilitate insertion of the key and with portions of the head and reach member held spaced by the said non-planar surfaces, the holes in the reach member passing through the spaced portions, and means for drawing the key into engagement with the reach member.

ROLAND WM. FAULHABER.

References Cited in the file of this patent

UNITED STATES PATENTS

| Number | Name | Date |
| --- | --- | --- |
| 1,365,532 | Mountain | Jan. 11, 1921 |
| 2,137,335 | Gabb | Nov. 22, 1938 |
| 2,152,553 | Lobdell | Mar. 28, 1939 |
| 2,390,215 | Grill | Dec. 4, 1945 |

FOREIGN PATENTS

| Number | Country | Date |
| --- | --- | --- |
| 474,459 | Great Britain | Nov. 2, 1937 |